United States Patent
Manolakos et al.

(10) Patent No.: US 11,558,159 B2
(45) Date of Patent: Jan. 17, 2023

(54) CONFIGURABLE SET OF OVERLOADED DOWNLINK CONTROL INFORMATION FIELDS USED FOR DEMODULATION REFERENCE SIGNAL BUNDLING

(71) Applicant: QUALCOMM Incorporated, San Diego, CA (US)

(72) Inventors: Alexandros Manolakos, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/016,294

(22) Filed: Sep. 9, 2020

(65) Prior Publication Data
US 2021/0075571 A1 Mar. 11, 2021

(30) Foreign Application Priority Data
Sep. 10, 2019 (GR) .............................. 20190100388

(51) Int. Cl.
*H04W 72/04* (2009.01)
*H04L 5/00* (2006.01)

(52) U.S. Cl.
CPC ......... *H04L 5/0048* (2013.01); *H04W 72/042* (2013.01); *H04W 72/0446* (2013.01)

(58) Field of Classification Search
CPC ........... H04W 72/0446; H04W 72/042; H04W 72/10; H04W 24/08; H04L 5/0046;
(Continued)

(56) References Cited

U.S. PATENT DOCUMENTS 9,729,295 B2 * 8/2017 Zhang ................... H04L 5/0053
2013/0294318 A1 11/2013 Amerga et al.
(Continued)

FOREIGN PATENT DOCUMENTS

WO 2018231971 A1 12/2018

OTHER PUBLICATIONS

CATT: "On QCL for NR", 3GPP Draft; RI-1717821, 3rd Generation Partnership Project (3GPP), Mobile Competence Centre; 650, Route Des Lucioles ; F-06921 Sophia-Antipolis Cedex; France; vol. RAN WGI, No. Prague, Czech Rep; Oct. 9, 2017-Oct. 13, 2017, Oct. 3, 2017 (Oct. 3, 2017), XP051352776, Retrieved from the Internet: URL:http://www.3gpp.org/ftp/tsg ran/WGI RL1/TSGRI 90b/Docs/ [retrieved on Oct. 3, 2017] Sect. 2.
(Continued)

*Primary Examiner* — Wei Zhao
(74) *Attorney, Agent, or Firm* — Arent Fox, LLP

(57) ABSTRACT

A UE is configured to receive parameters for a same set of DCI fields from a plurality of DCI fields for a first PDSCH and a second PDSCH, the first PDSCH including a first set of DMRS and the second PDSCH including a second set of DMRS. The apparatus is further configured to determine implicitly whether the DMRS of the second PDSCH is time-domain bundled with the DMRS of the first PDSCH based on the at least one of the parameters in the set of DCI fields, the number of parameters in the set of DCI fields, information related to the scrambling, or the resource location of the first PDSCH and the second PDSCH.

30 Claims, 8 Drawing Sheets

(58) Field of Classification Search
CPC ... H04L 5/0048; H04L 5/0042; H04L 5/0007; H04L 27/2647
See application file for complete search history.

(56) References Cited

U.S. PATENT DOCUMENTS

2014/0233541 A1      8/2014  Kim
2017/0331670 A1*    11/2017  Parkvall ............... H04J 11/0079
2020/0022011 A1      1/2020  Lee et al.
2020/0314881 A1*    10/2020  Bagheri ............ H04W 72/1273

OTHER PUBLICATIONS

NTT DOCOMO et al: "Work plan for Rel-15 NR WI", 3GPP Draft; R1-1718177 RAN1 Work Plan for NR, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 3, 2017, XP051352885.

QUALCOMM: "Remaining issues on NR OM-RS", 3GPP Draft; R1-1716731, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017, XP051353820.

International Search Report and Written Opinion dated Nov. 26, 2020 from corresponding PCT Application No. PCT/US2020/050210.

* cited by examiner

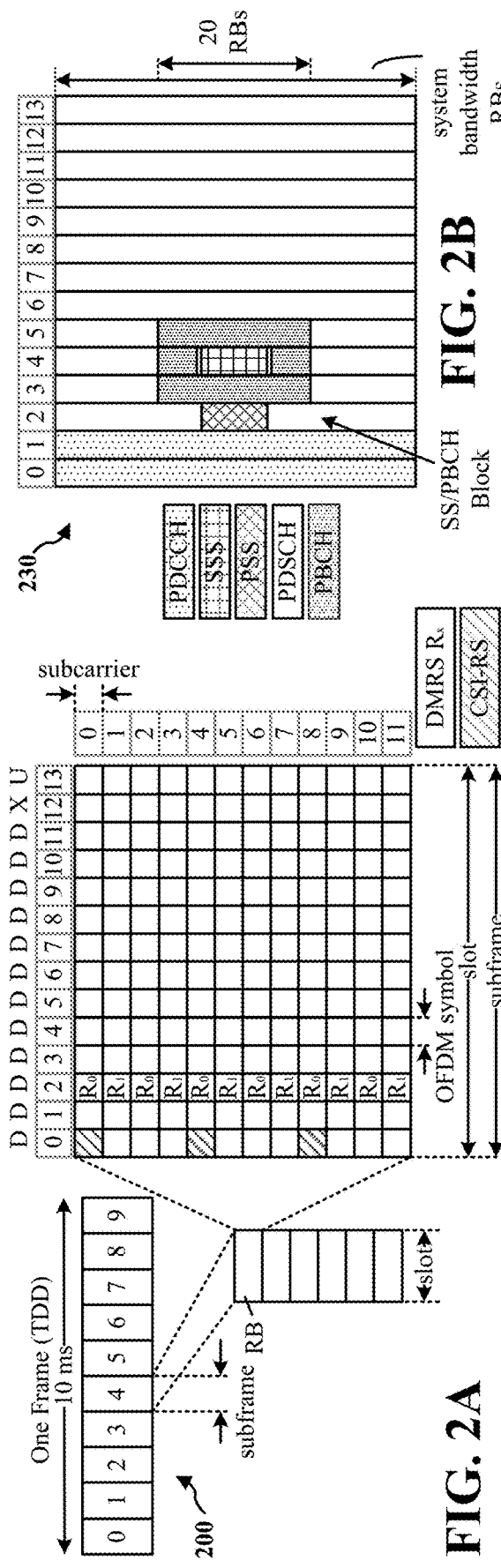
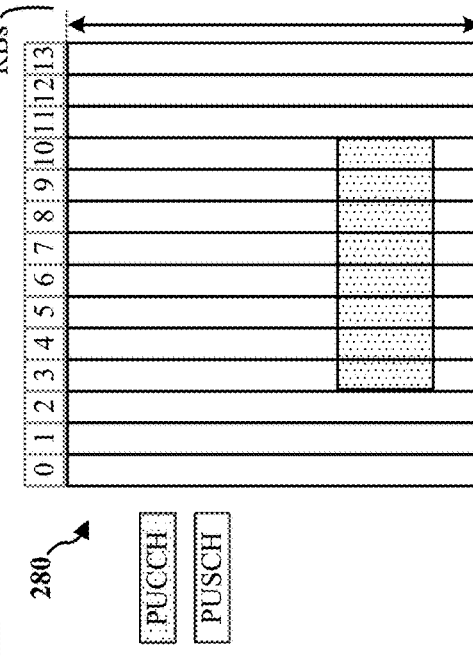
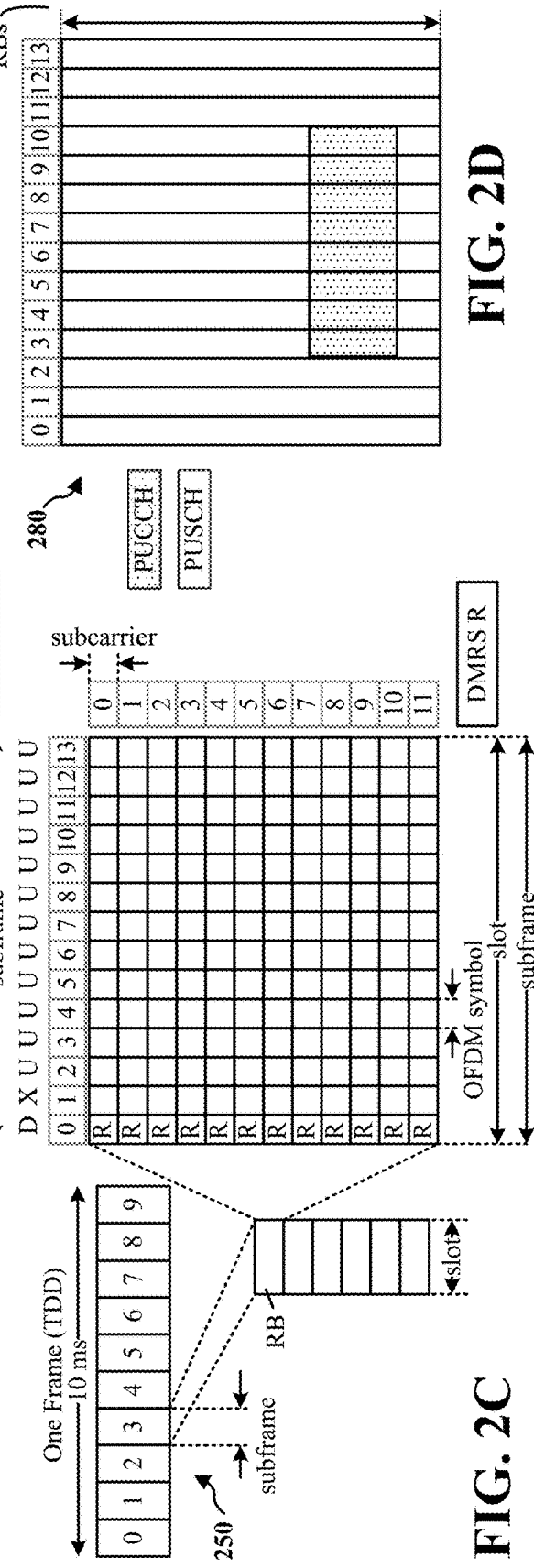
FIG. 2A
FIG. 2B
FIG. 2C
FIG. 2D

CONFIGURABLE SET OF OVERLOADED DOWNLINK CONTROL INFORMATION FIELDS USED FOR DEMODULATION REFERENCE SIGNAL BUNDLING

CROSS REFERENCE TO RELATED APPLICATION(S)

This application claims the benefit of Greek Application Serial No. 20190100388, entitled "CONFIGURABLE SET OF OVERLOADED DCI FIELDS USED FOR IMPLICIT DMRS BUNDLING DETERMINATION IN NR" and filed on Sep. 10, 2019, the disclosure of which is expressly incorporated by reference herein in its entirety.

BACKGROUND

Technical Field

The present disclosure relates generally to communication systems, and more particularly, to an implicit demodulation reference signals (DMRS) bundling determination.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

If a base station is signaling explicitly that two consecutive physical downlink shared channels (PDSCHs) are time-domain bundled, similarities between two grants of the two PDSCHs are likely to exist. For example, the same port identifiers (IDs) may be used in the previous PDSCH and the new PDSCH, or the previous PDSCH and the new PDSCH may be of the same Type (Type A both, or Type B both), or the previous PDSCH and the new PDSCH may have the same demodulation reference signal (DMRS) pattern with respect to the actual location of DMRS symbols within the PDSCH, or the same frequency domain assignment may be used across the 2 PDSCHs, or a same frequency domain assignment Type (Type 0/1) may be used, or a same PRG across the 2 PDSCHs may be used, or the second PDSCH may have at least as large PRG as the first PDSCH, or a number of layers of the second PDSCH may be the same as a number of layers of the first PDSCH, or a same DMRS sequence initialization may be used, or a same TCI-state indication may be used, etc.

In various aspects, any single one and/or combination of the foregoing parameters may be used as an implicit indication of a DMRS time-domain bundling across the two PDSCHs. However, the above similarities may remain the same across different grants even if the DMRS time-domain bundling is off. There may be a need to develop configurable set of overloaded downlink control information (DCI) fields used for implicit DMRS time-domain bundling determination.

In an aspect of the disclosure, a method, a computer-readable medium, and an apparatus are provided. The apparatus may be a user equipment (UE) configured to receive parameters for a same set of DCI fields from a plurality of DCI fields for a first PDSCH and a second PDSCH, where the first PDSCH may include a first set of DMRS and the second PDSCH may include a second set of DMRS. The apparatus is further configured to determine at least one of (1) the parameters in the set of DCI fields for the first PDSCH and the second PDSCH, (2) a number of the parameters in the set of DCI fields for the first PDSCH and the second PDSCH, (3) information related to the scrambling of a first PDCCH and a second PDCCH, the first PDCCH scheduling the PDSCH and the second PDCCH scheduling the second PDSCH, where the first PDCCH may schedule the first PDSCH and the second PDCCH may schedule the second PDSCH, or (4) a resource location of the first PDSCH and the second PDSCH. The apparatus is further configured to determine implicitly whether the DMRS of the second PDSCH is time-domain bundled with the DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH.

In an aspect of the disclosure, a method, a computer-readable medium, and an apparatus are provided. The apparatus may be a UE configured to receive a first PDCCH scheduling a first PDSCH and a second PDCCH scheduling a second PDSCH, where each of the first PDCCH and the second PDCCH may contain a corresponding DCI, each DCI may contain a plurality of DCI fields, where the first PDSCH includes a first set of DMRS and the second PDSCH includes a second set of DMRS. The apparatus is further configured to receive parameters for a same set of DCI fields from the plurality of DCI fields for the first PDSCH and the second PDSCH. The apparatus is further configured to determine at least one of (1) the parameters in the set of DCI fields for the first PDSCH and the second PDSCH, (2) a number of the parameters in the set of DCI fields for the first PDSCH and the second PDSCH, (3) information related to the scrambling of the first PDCCH and the second PDCCH, or (4) a resource location of the first PDSCH and the second PDSCH. The apparatus is further configured to determine implicitly whether the DMRS of the second PDSCH is time-domain bundled with the DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
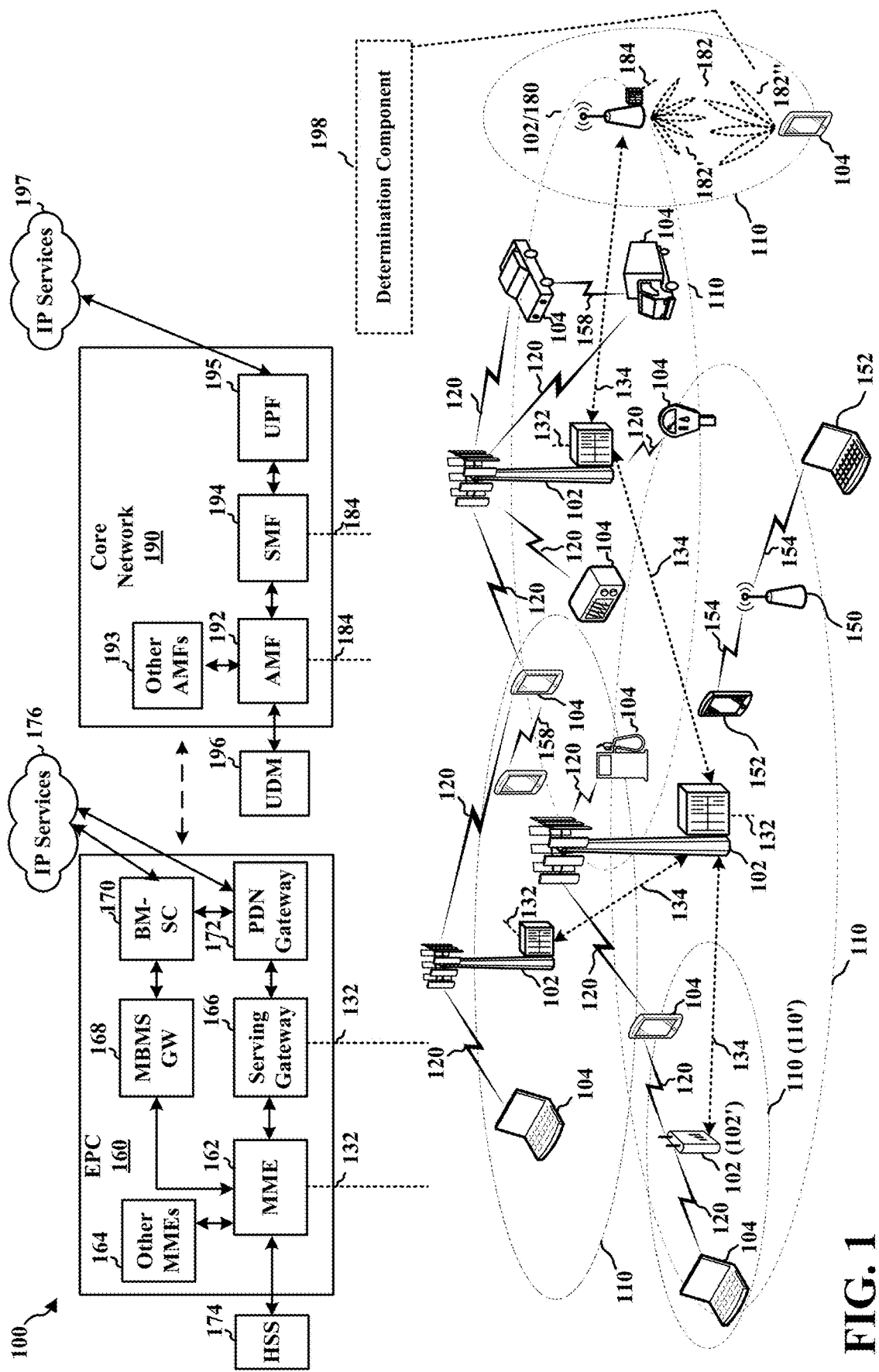
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive (e.g., from the base station 102/180) parameters for a same set of downlink control information (DCI) fields from a plurality of DCI fields for a first physical downlink control channel (PDSCH) and a second PDSCH, where the first PDSCH may include a first set of demodulation reference signals (DMRS) and the second PDSCH including a second set of DMRS.

The UE 104 may include a determination component 198 configured to determine at least one of (1) the parameters in the set of DCI fields for the first PDSCH and the second PDSCH, (2) a number of the parameters in the set of DCI fields for the first PDSCH and the second PDSCH, (3) information related to the scrambling of a first physical downlink control channel (PDCCH) and a second PDCCH, where the first PDCCH may schedule the PDSCH and the second PDCCH may schedule the second PDSCH, or (4) a resource location of the first PDSCH and the second PDSCH.

The determination component 198 may be further configured to determine implicitly whether the DMRS of the second PDSCH is time-domain bundled with the DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DCI, or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include DMRS (indicated as $R_x$ for one particular configuration, where $100x$ is the port number, but other DMRS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The PDCCH carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 2C, some of the REs carry DMRS (indicated as R for one particular configuration, but other DMRS configurations are possible) for channel estimation at the base station. The UE may transmit DMRS for the physical uplink control channel (PUCCH) and DMRS for the physical uplink shared channel (PUSCH). The PUSCH DMRS may be transmitted in the first one or two symbols of the PUSCH. The PUCCH DMRS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
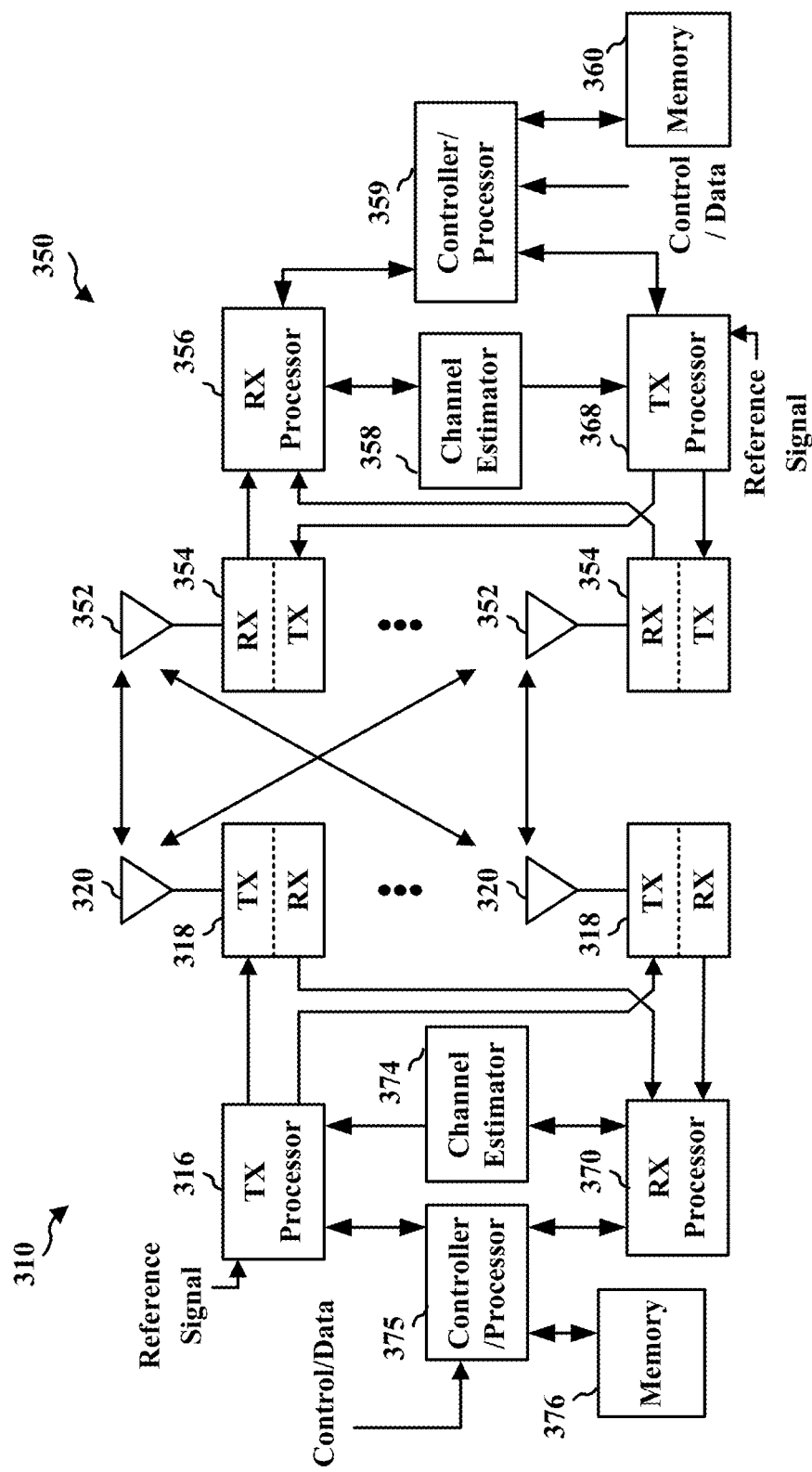
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 368, the RX processor 356, and the controller/processor 359 may be configured to perform aspects in connection with 198 of FIG. 1.

Figure 4A:
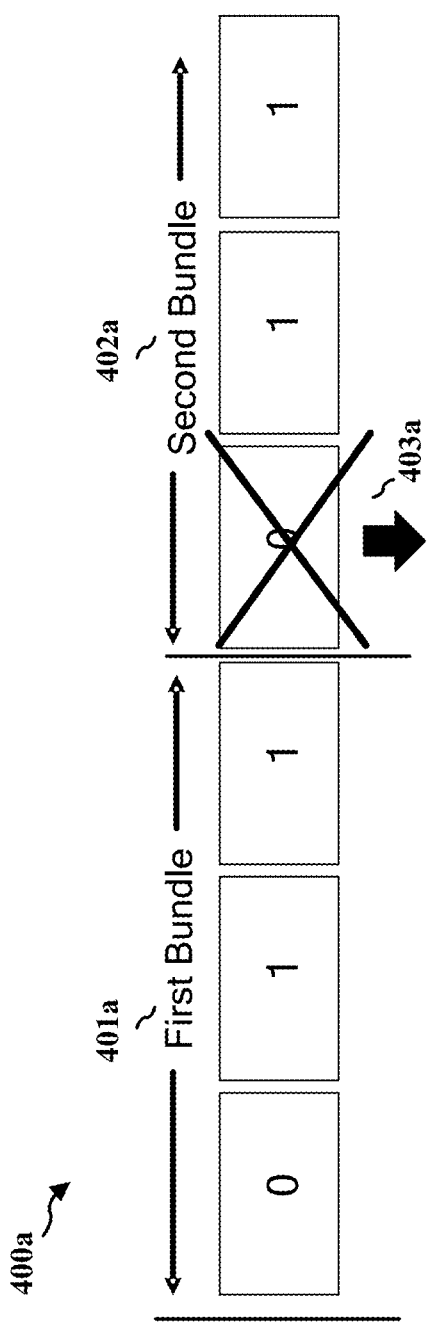
FIG. 4A and FIG. 4B are diagrams illustrating explicit DMRS time-domain bundling determination.
Figure 4B:
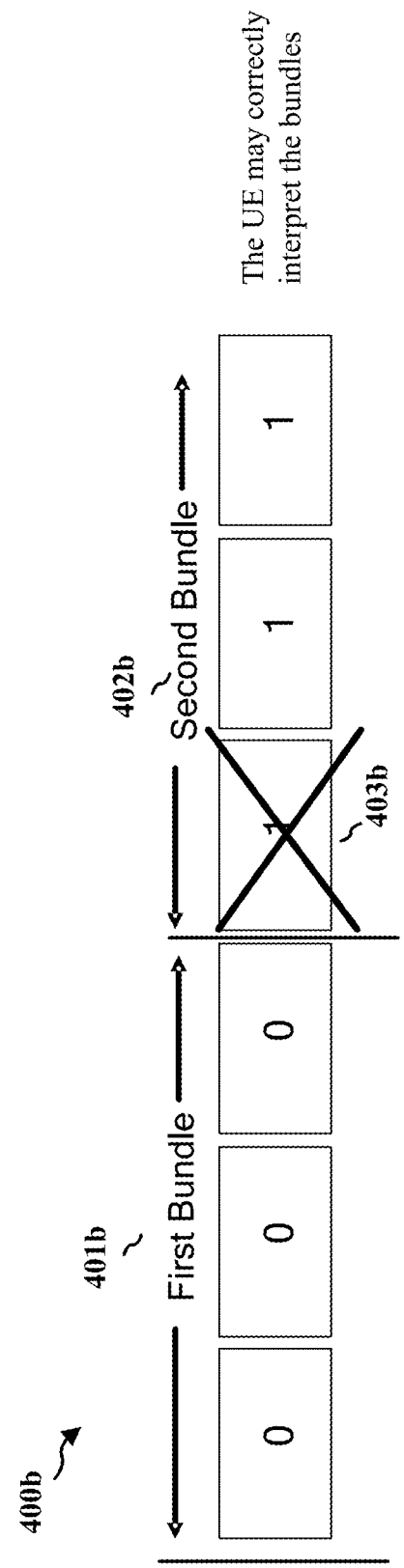

FIG. 4A and FIG. 4B are diagrams 400a and 400b illustrating explicit DMRS time-domain bundling determination. DMRS may be time-domain bundled. The receiver, e.g., a UE, may assume that a same precoder is used across data channels of different scheduling units. DMRS may be coherently transmitted over different time instants. At the receiver, the DMRS over different time instants may be coherently filtered to enhance the accuracy of channel estimation. For DMRS associated with a PDSCH, a channel over which the PDSCH symbol on one antenna port is conveyed may be inferred from a channel over which a DMRS symbol on the same antenna port is conveyed only if the two symbols are within the same resource as the scheduled PDSCH, in the same slot, and in the same physical resource block group (PRG). In some aspects, when the UE determines that a second set of DMRS of a second PDSCH is time-domain bundled with a first set of DMRS of a first PDSCH, the UE may decode at least one of the first PDSCH based on the second set of DMRS or the second PDSCH based on the first set of DMRS.

DMRS time-domain bundling may be determined based on explicit DCI field(s), e.g., with a new bundling indicator (NBI). Each PDCCH may contain a corresponding DCI, and each DCI may contain a plurality of DCI fields. One of the DCI fields is a new data indicator (NDI). The NDI may be used in a hybrid automatic retransmission request (HARQ) process. If the NDI bit is toggled, i.e., different from a NDI bit in a previous transmission, then, new data may be transmitted in a downlink channel for the HARQ process. Explicit NBI signaling in the DCI may be used to determine a DMRS time-domain bundling. For example, a DCI bit may have the format of the NBI for the time-domain DMRS bundling. If the NBI bit is toggled in a PDSCH grant, i.e., different from a NBI bit sent in a previous PDSCH transmission, then, "new precoder" (which means no DMRS time-domain bundling) may be used in a downlink channel for the PDSCH.

There may be different approaches for explicit DCI-based DMRS time-domain bundling determination, e.g., with NBI toggling. In one approach, as illustrated in FIG. 4A, when DCI bit=0, the PDSCH is not time-domain bundled with a previous PDSCH; when DCI bit=1, the PDSCH is time-domain bundled with the previous PDSCH. However, if the PDSCH 403a (DCI bit=0) is lost, the UE may incorrectly assume that the PDSCH in the second bundle 402a are also time-domain bundled with the PDSCHs in the first bundle 401a.

In another approach, a toggling type of a DCI-based signaling may be applied. For example, when a DCI bit is different than a previous DCI bit, the PDSCH may not be time-domain bundled with a previous PDSCH; when a DCI bit is the same as a previous DCI bit, the PDSCH is time-domain bundled with the previous PDSCH. As illustrated in FIG. 4B, if the PDSCH 403b (DCI bit=1) is lost, the UE may still interpret the bundles correctly.

Figure 5:
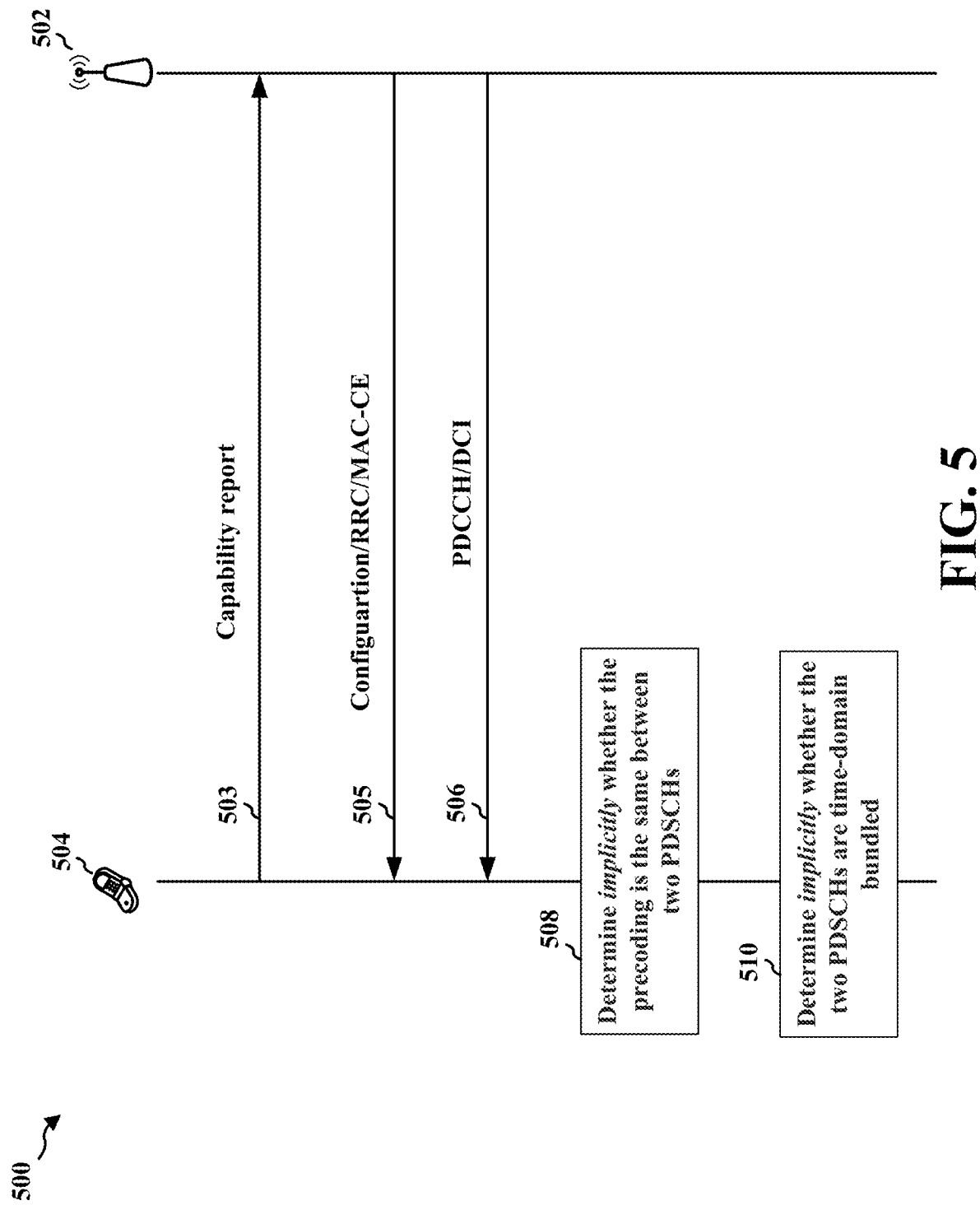
FIG. 5 is a diagram illustrating an example of implicit DMRS time-domain bundling determination.

FIG. 5 is a diagram illustrating an example of implicit DMRS time-domain bundling determination. At 506, a UE 504 may receive a first PDCCH scheduling a first PDSCH and a second PDCCH scheduling a second PDSCH, each of the first PDCCH and the second PDCCH may contain a corresponding DCI, each DCI may contain a plurality of DCI fields. The first PDSCH may include a first set of DMRS and the second PDSCH may include a second set of DMRS. The UE 504 may determine implicitly whether the second set of DMRS of the second PDSCH is time-domain bundled with the first set of DMRS of the first PDSCH, e.g., based on a set of DCI fields, the number of parameters in the set of DCI fields for the first PDSCH and the second PDSCH, information related to the scrambling of the first and second PDCCH, or the resource location of the first PDSCH and the second PDSCH, as illustrated at 510.

For example, available DCI fields and scheduling information in DCI format 1_1 may include: a frequency domain resource assignment (FDRA), a frequency domain assignment type (Type 0/1), a time domain resource allocation (TDRA), a PRG bundling indicator, a virtual resource block (VRB) to PRB (VRB-2-PRB) mapping indicator, a carrier indicator, a rate matching indicator, a zero power (ZP) channel state information (CSI) RS (ZP CSI-RS) trigger, a transmission configuration indicator (TCI) state, a bandwidth part (BWP) indicator, a modulation and coding scheme (MCS), a NDI, a redundancy version (RV) per transport block (TB), a HARQ process number, an antenna port, a PUCCH resource indicator, a transmitter power control (TPC) command for a scheduled PUCCH, SRS request, a code block group (CBG) transmission information, or a DMRS sequence initialization, etc.

For another example, available DCI fields and scheduling information in DCI format 0_1 may include: a carrier indicator, a BWP indicator, an FDRA, a time domain resource assignment, a frequency hopping flag, an MCS, a NDI, an RV, a HARQ process number, a TPC command for scheduled PUSCH, an UL/Supplementary Uplink (SUL) indicator, an SRS resource indicator, a precoding information and number of layers, antenna ports, an SRS request, a CSI request, a CBG transmission information (CBGTI), a phase tracking reference signal (PTRS) and DMRS association, a beta_offset indicator, a DMRS sequence initialization, an uplink shared channel (UL-SCH) indicator, etc.

It might be advantageous to find a set of DCI fields from the available DCI fields, such that the UE 504 may use the set of DCI fields to determine implicitly that DMRS time-domain bundling is on for this PDSCH, without restricting too much the scheduling flexibility. Thus, introducing a new bit in the DCI may be avoided. For example, one or more DCI fields may be used to implicitly determine that the DMRS are time-domain bundled without the need to introduce the new bit. In this way, higher data rates/capacity/spectral efficiency may be achieved.

There may be same or similar scheduling parameters when the first PDSCH is time-domain bundled with the second PDSCH. If a base station 502 is signaling explicitly that two consecutive PDSCHs are time-domain bundled, it is very likely that similarities between two grants of the two PDSCHs may exist. For example, the same port IDs may be used in the previous PDSCH and the new PDSCH, or the previous PDSCH and the new PDSCH may be of the same Type (Type A both, or Type B both), or the previous PDSCH and the new PDSCH may have the same DMRS pattern with respect to the actual location of DMRS symbols within the PDSCH, or the same frequency domain assignment may be used across the 2 PDSCHs, or a same frequency domain assignment Type (Type 0/1) may be used, or a same PRG across the 2 PDSCHs may be used, or the second PDSCH may have at least as large PRG as the first PDSCH, or a number of layers of the second PDSCH may be the same as a number of layers of the first PDSCH, or a same DMRS sequence initialization may be used, or a same TCI-state indication may be used, etc. Any combination of the above parameters may be used as an implicit indication of the DMRS time-domain bundling across multiple PDSCHs.

However, the above similarities may remain the same across different grants even if the time-domain bundling is off. Thus, which combination of the above parameters may be expected to be likely the same, and therefore, may be used to signal time-domain bundling across multiple PDSCHs, may depend on the scheduler implementation, channel condition, deployment scenario, etc. For example, in multi-TRP, a same DMRS sequence may not be used to signal a same time-domain bundling. For another example, in single-beam operation, a same TCI state may not be used to signal a same time-domain bundling. There may be a need to develop configurable set of overloaded DCI fields used for implicit DMRS time-domain bundling determination.

As illustrated in FIG. 5, the UE 504 may receive a configuration 505 through higher layer signaling (e.g., RRC or MAC CE). The UE 504 may be configured through higher layer signaling (e.g., RRC or medium access control-control element (MAC-CE)) with a set of fields in DCI, which may be used to determine implicitly that the precoding is the same between two PDSCHs granted by a same DCI format. No explicit DCI bit may be included in the DCIs. There may be multiple DCI fields in the set of DCI fields for the implicit determination, not just a single field for an explicit determination.

The UE 504 may determine whether the time-domain DMRS bundling is enabled across the two PDSCHs based on whether all the configured fields in the two corresponding DCIs have the same values, as illustrated at 508. If all the configured fields in the two corresponding DCIs have the same values, then the UE 504 may determine that the time-domain DMRS bundling is enabled across the two PDSCHs, as illustrated at 510. Otherwise, the UE 504 may determine that the precoding between the two PDSCHs is different, and the UE 504 may further determine the time-domain DMRS bundling is disabled. The base station 502 may not be able to schedule with the above parameters being the same without implicitly signaling that the DMRS time-domain bundling is enabled, since there is no explicit signaling in the DCI which disables the bundling. Thus, the base station 502 may change one of the values of the scheduling parameters to implicitly disable the DMRS time-domain bundling.

The base station 502 may configure through RRC a subset of scheduling parameters which may be the same in order for the UE 504 to implicitly determine that the DMRS is time-domain bundled. For example, the base station 502 may configure through RRC a subset of scheduling parameters including port IDs and types of PDSCH, which may be the same for the UE 504 to implicitly determine that the DMRS is time-domain bundled. The subset of scheduling parameters may be configured per BWP, or per DCI type (DCI 1_0 or DCI 1_1), or per DCI type and per BWP.

In one configuration, if no set is configured, then the UE 504 may assume that PDSCH bundling is always disabled. Alternatively, if no set is configured, the UE 504 may assume that PDSCH bundling is always enabled.

In one configuration, if the set contains only one parameter, then the UE may assume that the PDSCH bundling is always enabled. Alternatively, if the set contains only one parameter, the UE may assume that the PDSCH bundling is always disabled.

For two PDSCHs scheduled by PDCCH scrambled by system information (SI) radio network temporary identifier (RNTI) (SI-RNTI), no time-domain bundling is possible.

For two PDSCHs scheduled by PDCCHs in Common Search Space (CSS), no time-domain bundling is possible.

In one configuration, the UE 504 may report capability to the base station 502 indicating which field(s) of the two DCIs are to be the same for being able to bundle the corresponding data channels, as illustrated at 503. For example, the UE 504 may report separate capability for PDSCH and PUSCH. For another example, the UE 504 may report separate capability for different bands, or FR1/FR2 differentiation, or FDD/TDD differentiation. For example, the configuration 505 may be received in response to the UE capability information sent to the base station 502.

Figure 6:
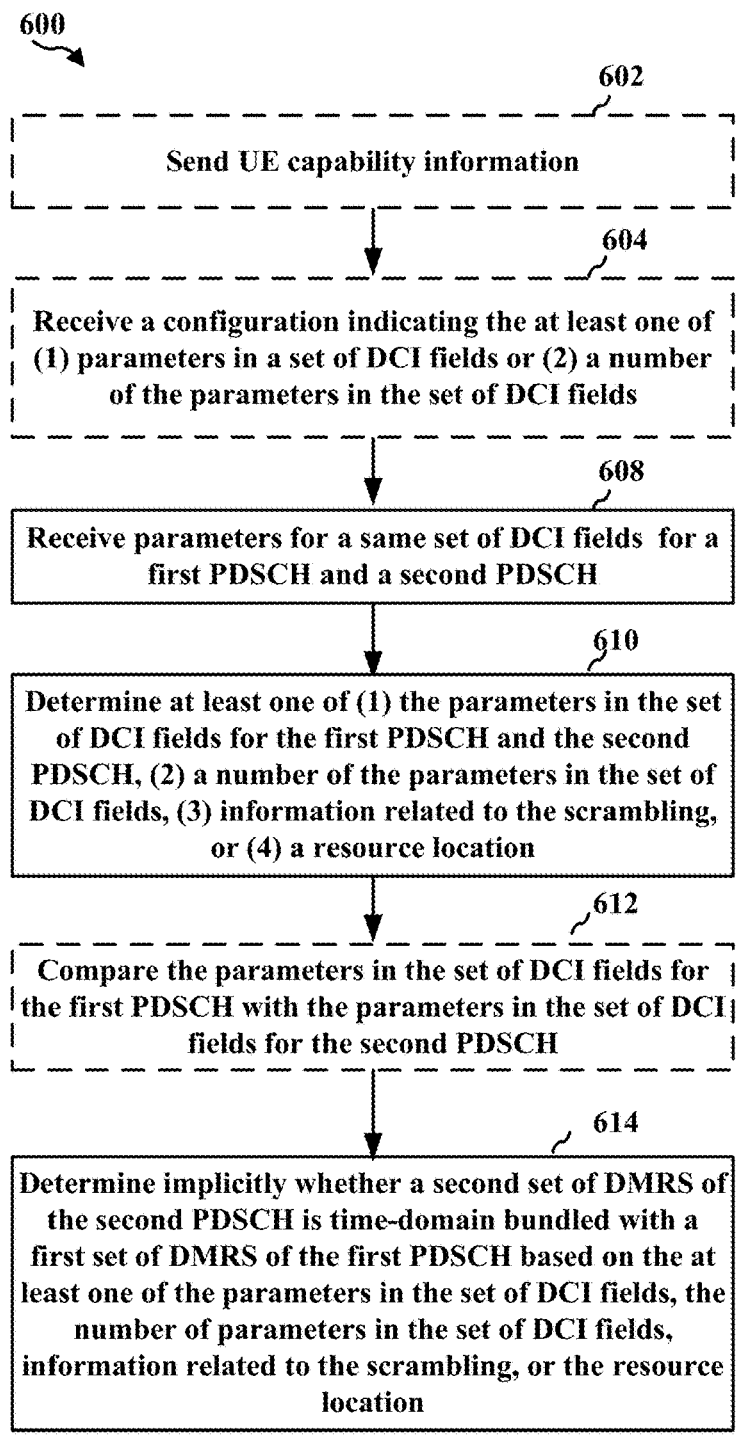
FIG. 6 is a flowchart of a method of wireless communication.

FIG. 6 is a flowchart 600 of a method of wireless communication. The method may be performed by a UE (e.g., the UE 104, 504; the apparatus 702/702'; the processing system 814, which may include the memory 360 and which may be the entire UE or a component of the UE, such as the TX processor 368, the RX processor 356, and/or the controller/processor 359). To facilitate an understanding of the techniques and concepts described herein, the method of flowchart 600 may be discussed with reference to the examples illustrated in FIGS. 4-5. Optional aspects may be illustrated in dashed lines. Aspects presented herein provide a method to implicitly determine that the DMRS are time-domain bundled. In this way, higher data rates/capacity/spectral efficiency may be achieved.

At 602, the UE may send UE capability information to a base station, where the UE capability information may comprise a UE capability associated with an implicit determination by the UE for determining whether a second PDSCH is time-domain bundled with a first PDSCH, wherein a configuration may be received in response to the UE capability information sent to the base station. For example, 602 may be performed by a transmission component 706 from FIG. 7. For example, referring back to FIGS. 4-5, at 506, a UE 504 may receive a first PDCCH scheduling a first PDSCH and a second PDCCH scheduling a second PDSCH, each of the first PDCCH and the second PDCCH may contain a corresponding DCI, each DCI may contain a plurality of DCI fields. The first PDSCH may include a first set of DMRS and the second PDSCH may include a second set of DMRS. The UE 504 may report capability to the base station 502 indicating which field(s) of the two DCIs are to be the same for being able to bundle the corresponding data channels, as illustrated at 503. For example, the UE 504 may report separate capability for PDSCH and PUSCH. For another example, the UE 504 may report separate capability for different bands, or FR1/FR2 differentiation, or FDD/TDD differentiation. For example, the configuration 505 may be received in response to the UE capability information sent to the base station 502.

At 604, the UE may receive a configuration indicating the at least one of (1) parameters in a set of DCI fields or (2) a number of the parameters in the set of DCI fields for the first PDSCH and the second PDSCH. For example, 604 may be performed by a configuration component 708 from FIG. 7. For example, referring back to FIGS. 4-5, the UE 504 may receive a configuration 505 through higher layer signaling (e.g., RRC or MAC CE). The UE 504 may be configured through higher layer signaling (e.g., RRC or medium access control-control element (MAC-CE)) with a set of fields in DCI, which may be used to determine implicitly that the precoding is the same between two PDSCHs granted by a same DCI format. No explicit DCI bit may be included in the DCIs. There may be multiple DCI fields in the set of DCI fields for the implicit determination, not just a single field for an explicit determination.

At 608, the UE may receive the parameters for the same set of DCI fields from the plurality of DCI fields for the first PDSCH and the second PDSCH. For example, 608 may be performed by a parameter component 710 from FIG. 7. For example, referring back to FIGS. 4-5, each of the first PDCCH and the second PDCCH may contain a corresponding DCI, each DCI may contain a plurality of DCI fields. The UE 504 may determine implicitly whether the second set of DMRS of the second PDSCH is time-domain bundled with the first set of DMRS of the first PDSCH, e.g., based on a set of DCI fields, the number of parameters in the set of DCI fields for the first PDSCH and the second PDSCH, information related to the scrambling of the first and second PDCCH, or the resource location of the first PDSCH and the second PDSCH, as illustrated at 510.

At 610, the UE may determining at least one of (1) the parameters in the set of DCI fields for the first PDSCH and the second PDSCH, (2) the number of the parameters in the set of DCI fields for the first PDSCH and the second PDSCH, (3) information related to the scrambling of the first PDCCH and the second PDCCH, or (4) a resource location of the first PDSCH and the second PDSCH. For example, 610 may be performed by a determination component 712 from FIG. 7. For example, referring back to FIGS. 4-5, the base station 502 may configure through RRC a subset of scheduling parameters which may be the same in order for the UE 504 to implicitly determine that the DMRS is time-domain bundled. For example, the base station 502 may configure through RRC a subset of scheduling parameters including port IDs and types of PDSCH, which may be the same for the UE 504 to implicitly determine that the DMRS is time-domain bundled. The subset of scheduling parameters may be configured per BWP, or per DCI type (DCI 1_0 or DCI 1_1), or per DCI type and per BWP.

At 612, the UE may compare the parameters in the set of DCI fields for the first PDSCH with the parameters in the set of DCI fields for the second PDSCH, and the UE may determine implicitly whether the second PDSCH is time-domain bundled with the first PDSCH based on the comparison. For example, 612 may be performed by a comparison component 714 from FIG. 7. For example, referring back to FIGS. 4-5, the UE 504 may determine whether the time-domain DMRS bundling is enabled across the two PDSCHs based on whether all the configured fields in the two corresponding DCIs have the same values, as illustrated at 508. If all the configured fields in the two corresponding DCIs have the same values, then the UE 504 may determine that the time-domain DMRS bundling is enabled across the two PDSCHs, as illustrated at 510. Otherwise, the UE 504 may determine that the precoding between the two PDSCHs is different, and the UE 504 may further determine the time-domain DMRS bundling is disabled. The base station 502 may not be able to schedule with the above parameters being the same without implicitly signaling that the DMRS time-domain bundling is enabled, since there is no explicit signaling in the DCI which disables the bundling. Thus, the base station 502 may change one of the values of the scheduling parameters to implicitly disable the DMRS time-domain bundling.

At 614, the UE may determine implicitly whether the second set of DMRS of the second PDSCH is time-domain bundled with the first set of DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH. For example, 614 may be performed by the determination component 712 from FIG. 7. For example, referring back to FIGS. 4-5, the UE 504 may determine whether the time-domain DMRS bundling is enabled across the two PDSCHs based on whether all the configured fields in the two corresponding DCIs have the same values, as illustrated at 508. If all the configured fields in the two corresponding DCIs have the same values, then the UE 504 may determine that the time-domain DMRS bundling is enabled across the two PDSCHs, as illustrated at 510. Otherwise, the UE 504 may determine that the precoding between the two PDSCHs is different, and the UE 504 may further determine the time-domain DMRS bundling is disabled. In one configuration, if no set is configured, then the UE 504 may assume that PDSCH bundling is always disabled. Alternatively, if no set is configured, the UE 504 may assume that PDSCH bundling is always enabled. In one configuration, if the set contains only one parameter, then the UE may assume that the PDSCH bundling is always enabled. Alternatively, if the set contains only one parameter, the UE may assume that the PDSCH bundling is always disabled. For two PDSCHs scheduled by PDCCH scrambled by system information (SI) radio network temporary identifier (RNTI) (SI-RNTI), no time-domain bundling is possible. For two PDSCHs scheduled by PDCCHs in Common Search Space (CSS), no time-domain bundling is possible.

In some aspects, the UE may receive a NBI indicating whether the second PDSCH is time-domain bundled with the first PDSCH, where the UE may determine whether the second PDSCH is time-domain bundled with the first PDSCH based on both an explicit determination based on the NBI and an implicit determination based on the at least one of the parameters in the set of DCI fields or the number of parameters in the set of DCI fields for the first PDSCH and the second PDSCH.

In some aspects, the UE may determine whether the second PDSCH is not time-domain bundled with the first PDSCH based on the at least one of the parameters in the set of DCI fields or the number of parameters in the set of DCI fields for the first PDSCH and the second PDSCH when the NBI indicates that the second PDSCH is time-domain bundled with the first PDSCH.

In some aspects, the UE may decode at least one of the first PDSCH based on the second set of DMRS or the second PDSCH based on the first set of DMRS when the UE determines that the DMRS of the second PDSCH is time-domain bundled with the DMRS of the first PDSCH.

Figure 7:
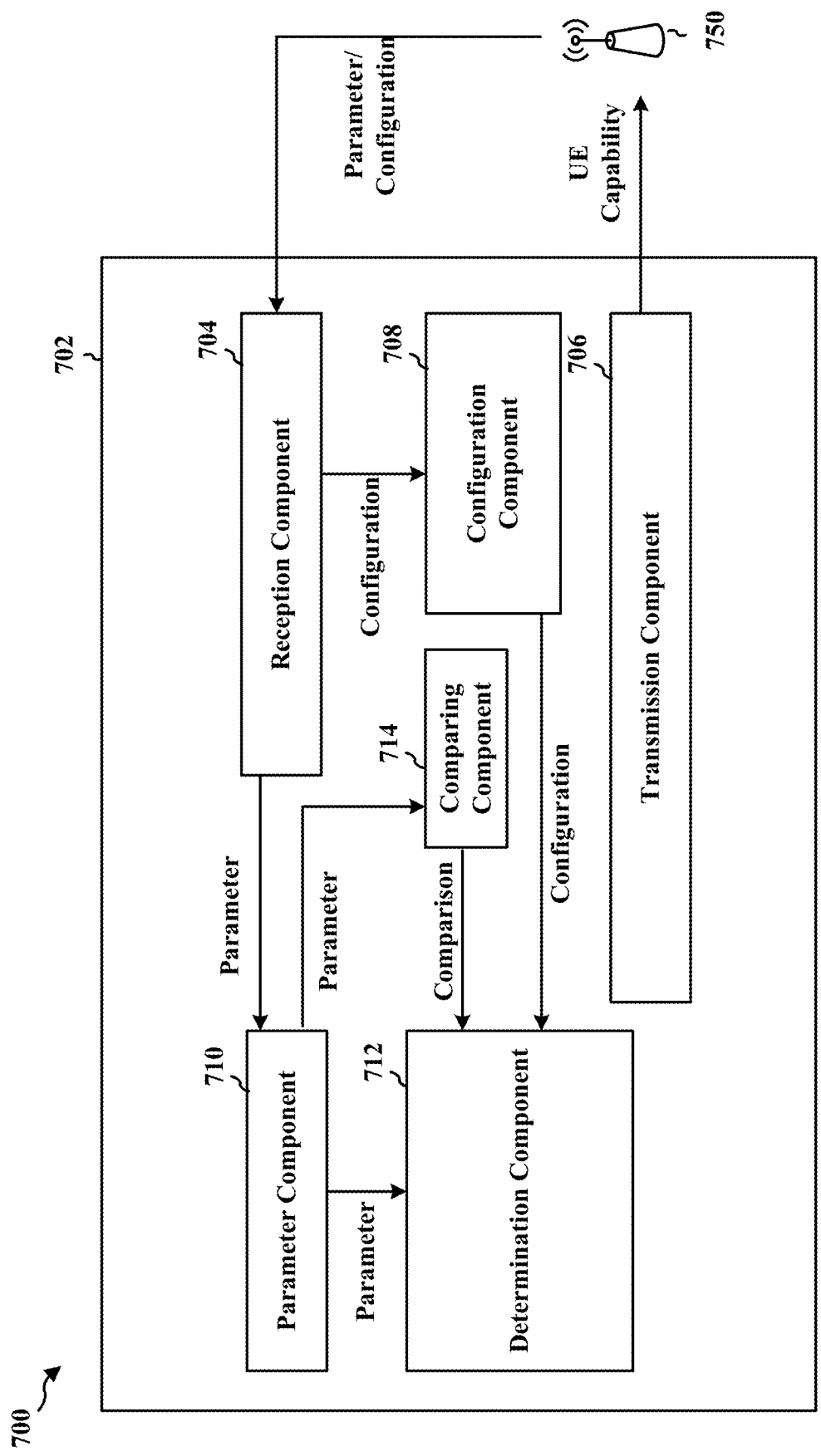
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE (e.g., the UE 104, 504; the apparatus 702/702'; the processing system 814, which may include the memory 360 and which may be the entire UE or a component of the UE, such as the TX processor 368, the RX processor 356, and/or the controller/processor 359). The apparatus includes a reception component 704 that receives PDCCH/PDSCH from a base station, e.g., as described in connection with 606 in FIG. 6. The apparatus includes a transmission component 706 that sends UE capability, e.g., as described in connection with 602 in FIG. 6. The apparatus includes a configuration component 708 that receives a configuration from the base station, e.g., as described in connection with 604 in FIG. 6. The apparatus includes a parameter component 710 that receives parameters, via the reception component 704, from a base station, e.g., as described in connection with 606 in FIG. 6. The apparatus includes a determination component 712 that determines implicitly whether the second set of DMRS of the second PDSCH is time-domain bundled with the first set of DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH, e.g., as described in connection with 610, 614 in FIG. 6. The apparatus includes a comparison component 714 that compares the parameters in the set of DCI fields for the first PDSCH with the parameters in the set of DCI fields for the second PDSCH, e.g., as described in connection with 612 in FIG. 6.

The apparatus may include additional components that perform each of the blocks of the algorithm in the aforementioned flowcharts of FIGS. 4-6. As such, each block in the aforementioned flowcharts of FIGS. 4-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
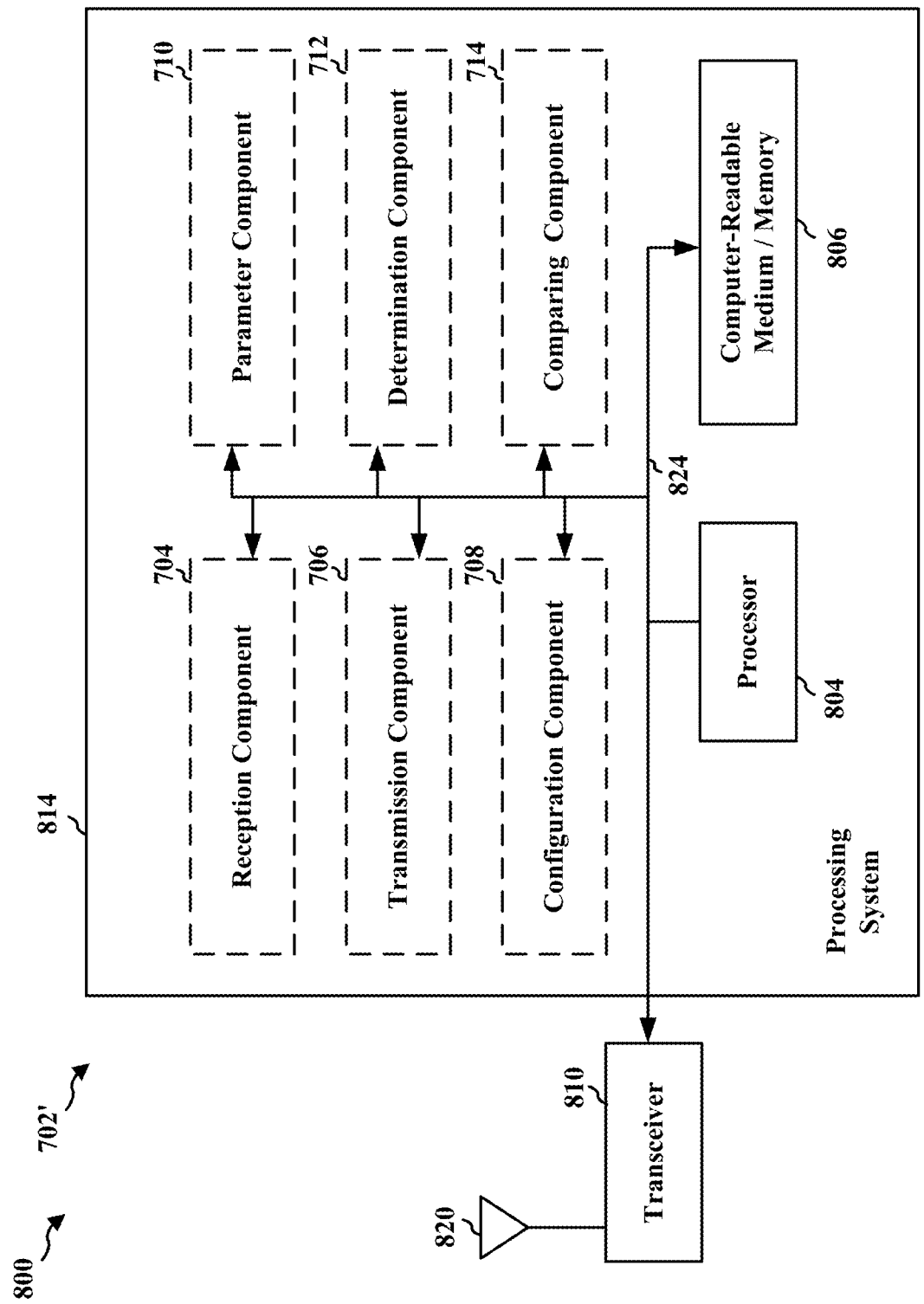
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for receiving a first PDCCH scheduling a first PDSCH and a second PDCCH scheduling a second PDSCH, where each of the first PDCCH and the second PDCCH may contain a corresponding DCI, each DCI may contain a plurality of DCI fields, where the first PDSCH includes a first set of DMRS and the second PDSCH includes a second set of DMRS. The apparatus further comprises means for receiving parameters for a same set of DCI fields from the plurality of DCI fields for the first PDSCH and the second PDSCH. The apparatus further comprises means for determining at least one of (1) the parameters in the set of DCI fields for the first PDSCH and the second PDSCH, (2) a number of the parameters in the set of DCI fields for the first PDSCH and the second PDSCH, (3) information related to the scrambling of the first PDCCH and the second PDCCH, or (4) a resource location of the first PDSCH and the second PDSCH. The apparatus further comprises means for determining implicitly whether the DMRS of the second PDSCH is time-domain bundled with the DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   receiving parameters for a same set of downlink control information (DCI) fields from a plurality of DCI fields for a first physical downlink shared channel (PDSCH) and a second PDSCH, the first PDSCH including a first set of demodulation reference signals (DMRS) and the second PDSCH including a second set of DMRS;
   determining at least one of (1) the parameters in the set of DCI fields for the first PDSCH and the second PDSCH, (2) a number of the parameters in the set of DCI fields for the first PDSCH and the second PDSCH, (3) information related to the scrambling of a first physical downlink control channel (PDCCH) and a second PDCCH, the first PDCCH scheduling the first PDSCH and the second PDCCH scheduling the second PDSCH, or (4) a resource location of the first PDSCH and the second PDSCH; and
   determining implicitly whether the second set of DMRS of the second PDSCH is time-domain bundled with the first set of DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH.

2. The method of claim 1, further comprising:
   decoding at least one of the first PDSCH based on the second set of DMRS or the second PDSCH based on the first set of DMRS when the UE determines that the DMRS of the second PDSCH is time-domain bundled with the DMRS of the first PDSCH.

3. The method of claim 1, wherein the parameters in the set of DCI fields are determined, the method further comprises:
   comparing the parameters in the set of DCI fields for the first PDSCH with the parameters in the set of DCI fields for the second PDSCH,
   wherein whether the second PDSCH is time-domain bundled with the first PDSCH is implicitly determined based on the comparison.

4. The method of claim 1, wherein the number of the parameters in the set of DCI fields are determined, and whether the second PDSCH is time-domain bundled with the first PDSCH is implicitly determined based on the number of the parameters in the set of DCI fields.

5. The method of claim 4, wherein, when the number of the parameters in the set of DCI fields is 0, the second PDSCH is implicitly determined to be time-domain bundled or not time-domain bundled with the first PDSCH.

6. The method of claim 4, wherein, when the number of the parameters in the set of DCI fields is 1, the second PDSCH is implicitly determined to be not time-domain bundled or time-domain bundled with the first PDSCH.

7. The method of claim 1, wherein whether the second PDSCH is time-domain bundled with the first PDSCH is implicitly determined based on whether the first PDSCH and the second PDSCH are scrambled by a same system information (SI) radio network temporary identifier (RNTI) (SI-RNTI).

8. The method of claim 1, wherein whether the second PDSCH is time-domain bundled with the first PDSCH is implicitly determined based on whether the first PDSCH and the second PDSCH are scheduled by the first PDCCH and the second PDCCH in a common search space (CSS).

9. The method of claim 1, further comprising:
receiving a configuration indicating the at least one of (1) the parameters in the set of DCI fields or (2) the number of the parameters in the set of DCI fields for the first PDSCH and the second PDSCH.

10. The method of claim 9, further comprising:
sending UE capability information to a base station, the UE capability information comprising a UE capability associated with an implicit determination for determining whether the second PDSCH is time-domain bundled with the first PDSCH, wherein the configuration is received in response to the UE capability information.

11. The method of claim 1, wherein the parameters in the set of DCI fields comprises at least one of a frequency domain resource assignment (FDRA), a frequency domain assignment type, a time domain resource allocation (TDRA), a physical resource block group (PRG) bundling indicator, a virtual resource block (VRB) to physical resource block (PRB) (VRB-2-PRB) mapping indicator, a carrier indicator, a rate matching indicator, a zero power (ZP) channel state information (CSI) reference signal (RS) (ZP CSI-RS) trigger, a transmission configuration indicator (TCI) state, a bandwidth part (BWP) indicator, a modulation and coding scheme (MCS), a new data indicator (NDI), a redundancy version (RV) per transport block (TB), a hybrid automatic retransmission request (HARQ) process number, an antenna port, a physical uplink control channel (PUCCH) resource indicator, a transmitter power control (TPC) command for a scheduled PUCCH, sounding reference signals (SRS) request, a code block group (CBG) transmission information, or a DMRS sequence initialization.

12. The method of claim 1, wherein the parameters in the set of DCI fields comprises at least one of a carrier indicator, a bandwidth part (BWP) indicator, a frequency domain resource assignment (FDRA), a time domain resource assignment, a frequency hopping flag, a modulation and coding scheme (MCS), a new data indicator (NDI), a redundancy version (RV), a hybrid automatic retransmission request (HARQ) process number, a transmitter power control (TPC) command for a scheduled physical uplink shared channel (PUSCH), an uplink (UL)/Supplementary Uplink (SUL) indicator, an SRS resource indicator, a precoding information and number of layers, antenna ports, a sounding reference signals (SRS) request, a channel state information (CSI) request, a code block group (CBG) transmission information (CBGTI), a phase tracking reference signal (PTRS) and DMRS association, a beta_offset indicator, a DMRS sequence initialization, an uplink shared channel (UL-SCH) indicator.

13. The method of claim 1, further comprising receiving a new bundling indicator (NBI) indicating whether the second PDSCH is time-domain bundled with the first PDSCH, wherein whether the second PDSCH is time-domain bundled with the first PDSCH is determined based on both an explicit determination based on the NBI and an implicit determination based on the at least one of the parameters in the set of DCI fields or the number of parameters in the set of DCI fields for the first PDSCH and the second PDSCH.

14. The method of claim 13, wherein whether the second PDSCH is not time-domain bundled with the first PDSCH is determined based on the at least one of the parameters in the set of DCI fields or the number of parameters in the set of DCI fields for the first PDSCH and the second PDSCH when the NBI indicates that the second PDSCH is time-domain bundled with the first PDSCH.

15. An apparatus for wireless communication at a user equipment (UE), comprising:
means for receiving parameters for a same set of downlink control information (DCI) fields from a plurality of DCI fields for a first physical downlink shared channel (PDSCH) and a second PDSCH, the first PDSCH including a first set of demodulation reference signals (DMRS) and the second PDSCH including a second set of DMRS;
means for determining at least one of (1) the parameters in the set of DCI fields for the first PDSCH and the second PDSCH, (2) a number of the parameters in the set of DCI fields for the first PDSCH and the second PDSCH, (3) information related to the scrambling of a first physical downlink control channel (PDCCH) and the second PDCCH, the first PDCCH scheduling the first PDSCH and the second PDCCH scheduling the second PDSCH, or (4) a resource location of the first PDSCH and the second PDSCH; and
means for determining implicitly whether the second set of DMRS of the second PDSCH is time-domain bundled with the first set of DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH.

16. The apparatus of claim 15, further comprising:
means for decoding at least one of the first PDSCH based on the second set of DMRS or the second PDSCH based on the first set of DMRS when the DMRS of the second PDSCH is time-domain bundled with the DMRS of the first PDSCH.

17. The apparatus of claim 15, wherein the parameters in the set of DCI fields are determined, and the apparatus further comprising:
means for comparing the parameters in the set of DCI fields for the first PDSCH with the parameters in the set of DCI fields for the second PDSCH, and whether the second PDSCH is time-domain bundled with the first PDSCH is implicitly determined based on the comparison.

18. The apparatus of claim 15, wherein whether the second PDSCH is time-domain bundled with the first PDSCH is implicitly determined based on the number of the parameters in the set of DCI fields.

19. The apparatus of claim 15, wherein whether the second PDSCH is time-domain bundled with the first PDSCH is implicitly determined based on whether the first PDSCH and the second PDSCH are scrambled by a same system information (SI) radio network temporary identifier (RNTI) (SI-RNTI).

20. The apparatus of claim 15, wherein whether the second PDSCH is time-domain bundled with the first PDSCH is implicitly determined based on whether the first PDSCH and the second PDSCH are scheduled by the first PDCCH and the second PDCCH in a common search space (CSS).

21. The apparatus of claim 15, further comprising:
means for receiving a configuration indicating the at least one of (1) the parameters in the set of DCI fields or (2) the number of the parameters in the set of DCI fields for the first PDSCH and the second PDSCH.

22. The apparatus of claim 21, further comprising:
means for sending UE capability information to a base station, the UE capability information comprising a UE capability associated with an implicit determination by the UE for determining whether the second PDSCH is time-domain bundled with the first PDSCH, wherein the configuration is received in response to the UE capability information.

23. The apparatus of claim 15, wherein the parameters in the set of DCI fields comprises at least one of a frequency domain resource assignment (FDRA), a frequency domain assignment type, a time domain resource allocation (TDRA), a physical resource block group (PRG) bundling indicator, a virtual resource block (VRB) to physical resource block (PRB) (VRB-2-PRB) mapping indicator, a carrier indicator, a rate matching indicator, a zero power (ZP) channel state information (CSI) reference signal (RS) (ZP CSI-RS) trigger, a transmission configuration indicator (TCI) state, a bandwidth part (BWP) indicator, a modulation and coding scheme (MCS), a new data indicator (NDI), a redundancy version (RV) per transport block (TB), a hybrid automatic retransmission request (HARD) process number, an antenna port, a physical uplink control channel (PUCCH) resource indicator, a transmitter power control (TPC) command for a scheduled PUCCH, a sounding reference signals (SRS) request, a code block group (CBG) transmission information, or a DMRS sequence initialization.

24. The apparatus of claim 15, further comprising:
means for receiving a new bundling indicator (NBI) indicating whether the second PDSCH is time-domain bundled with the first PDSCH, wherein whether the second PDSCH is time-domain bundled with the first PDSCH is determined based on both an explicit determination based on the NBI and an implicit determination based on the at least one of the parameters in the set of DCI fields or the number of parameters in the set of DCI fields for the first PDSCH and the second PDSCH.

25. An apparatus for wireless communication at a user equipment (UE), comprising:
a memory; and
at least one processor coupled to the memory and configured to:
receive parameters for a same set of downlink control information (DCI) fields from a plurality of DCI fields for a first physical downlink shared channel (PDSCH) and a second PDSCH, the first PDSCH including a first set of demodulation reference signals (DMRS) and the second PDSCH including a second set of DMRS;
determine at least one of (1) the parameters in the set of DCI fields for the first PDSCH and the second PDSCH, (2) a number of the parameters in the set of DCI fields for the first PDSCH and the second PDSCH, (3) information related to the scrambling of a first physical downlink control channel (PDCCH) and a second PDCCH, the first PDCCH scheduling the first PDSCH and the second PDCCH scheduling the second PDSCH, or (4) a resource location of the first PDSCH and the second PDSCH; and
determine implicitly whether the second set of DMRS of the second PDSCH is time-domain bundled with the first set of DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH.

26. The apparatus of claim 25, wherein the at least one processor is further configured to:
decode at least one of the first PDSCH based on the second set of DMRS or the second PDSCH based on the first set of DMRS when the DMRS of the second PDSCH is time-domain bundled with the DMRS of the first PDSCH.

27. The apparatus of claim 25, wherein the parameters in the set of DCI fields are determined, and the at least one processor is further configured to compare the parameters in the set of DCI fields for the first PDSCH with the parameters in the set of DCI fields for the second PDSCH, and whether the second PDSCH is time-domain bundled with the first PDSCH is implicitly determined based on the comparison.

28. The apparatus of claim 25, wherein the at least one processor is further configured to:
receive a configuration indicating the at least one of (1) the parameters in the set of DCI fields or (2) the number of the parameters in the set of DCI fields for the first PDSCH and the second PDSCH.

29. The apparatus of claim 28, wherein the at least one processor is further configured to:
send UE capability information to a base station, the UE capability information comprising a UE capability associated with an implicit determination for whether the second PDSCH is time-domain bundled with the first PDSCH, wherein the configuration is received in response to the UE capability information.

30. A non-transitory, computer-readable medium storing computer executable code for a user equipment (UE), the code when executed by a processor cause the processor to:
receive parameters for a same set of downlink control information (DCI) fields from a plurality of DCI fields for a first physical downlink shared channel (PDSCH) and a second PDSCH, the first PDSCH including a first set of demodulation reference signals (DMRS) and the second PDSCH including a second set of DMRS;
determine at least one of (1) the parameters in the set of DCI fields for the first PDSCH and the second PDSCH, (2) a number of the parameters in the set of DCI fields for the first PDSCH and the second PDSCH, (3) information related to the scrambling of a first physical downlink control channel (PDCCH) and a second PDCCH, the first PDCCH scheduling the first PDSCH and the second PDCCH scheduling the second PDSCH, or (4) a resource location of the first PDSCH and the second PDSCH; and determine implicitly whether the second set of DMRS of the second PDSCH is time-domain bundled with the first set of DMRS of the first PDSCH based on the at least one of the parameters in the set of DCI fields, the number of parameters in the set of DCI fields for the first PDSCH and the second PDSCH, information related to the scrambling of the first and second PDCCH, or the resource location of the first PDSCH and the second PDSCH.

\* \* \* \* \*